United States Patent [19]

Burns

[11] Patent Number: 4,469,144
[45] Date of Patent: Sep. 4, 1984

[54] AUTOMATIC POWDER DISPENSING METHODS AND APPARATUS

[75] Inventor: James A. Burns, Elizabeth, N.J.

[73] Assignee: Becton Dickinson and Company, Paramus, N.J.

[21] Appl. No.: 380,505

[22] Filed: May 21, 1982

[51] Int. Cl.³ .............................................. B65B 1/04
[52] U.S. Cl. ........................................ 141/1; 141/71; 141/86; 141/129; 222/352; 222/370
[58] Field of Search ...................................... 141/1–12, 141/37–81, 115–127, 249, 85–93, 129–191, 234–248; 222/352, 370

[56] References Cited

U.S. PATENT DOCUMENTS

| | | | |
|---|---|---|---|
| 2,602,579 | 7/1952 | Carruthers | 141/125 |
| 2,857,938 | 10/1958 | Wahl | 141/71 |
| 3,182,693 | 5/1965 | Sundberg | 141/71 |
| 3,552,454 | 1/1971 | Deming | 141/71 |
| 3,921,681 | 11/1975 | Rebmann | 141/71 |

Primary Examiner—Houston S. Bell, Jr.
Attorney, Agent, or Firm—Robert P. Grindle

[57] ABSTRACT

Methods and apparatus are provided for dispensing, simultaneously and automatically, a plurality of small quantities of powder under improved conditions of control. The arrangement is such that precise amounts of micro quantities of hard-to-handle powder may be dispensed into containers such as blood connection tubes. Included herein is a brush mechanism that reciprocates over a plate in a controlled manner, for sweeping a slug of powder deposited automatically on the plate in a controlled manner through a number of openings in the plate, and into an equal number of containers. The openings are dimensioned and configured to cooperate with the sweeping action of the brush, so that a desired precise quantity of powder is deposited through each opening into the waiting containers.

12 Claims, 8 Drawing Figures

AUTOMATIC POWDER DISPENSING METHODS AND APPARATUS

BACKGROUND AND STATEMENT OF THE INVENTION

This invention relates generally to methods and apparatus for dispensing fine powder. More particularly, this invention relates to methods and apparatus for the controlled dispensing of a plurality of equal quantities of powder into an equal number of containers. The invention is particularly directed to a mass production technique wherein fine powder reagents may be controlled and handled precisely in a production line for dispensing equal amounts simultaneously of a fine powder reagent into a plurality of waiting containers in the line.

In the handling of powder reagents, one of the difficulties in handling the powder is controlling it so that micro quantities may be dispensed in the powder amount into containers. When several containers are to be filled simultaneously, the control aspect of the situation becomes much more difficult. As will be understood by practitioners-in-the-art, when the powder involved is a reagent for use in medical applications, for example, it is much more necessary that a precise micro quantity of the reagent powder be properly dispensed into each container. The powders are reagents contained in such tubes react subsequently with the addition of blood samples taken from patients in order to provide tests of various physical conditions involved with the patients. It will be understood that if there is any significant variation in the quantities introduced into each container, then the subsequent testing procedures may be affected. Another major problem involved, other than variations in the quantities of the powder being dispensed, of course, is the fact that the powder is easily disturbed in its conveyance from one place to another so that the micro quantities involved with each dispensing procedure are affected.

With this invention, by contrast, methods and apparatus are provided for the precise controlled dispensing of fine powders. More particularly, the process and apparatus herein controls and dispenses simultaneously a plurality of quantities of such fine powders into a plurality of containers in the precise amounts required so that subsequent testing procedures utilizing the powder reagents will not be affected by any variation in the quantities dispensed.

The invention utilizes a plate having a plurality of bores or openings therein for receiving the individual quantities of powder being dispensed. The bores are configured and dimensioned to provide, in cooperation with the sweeping action of a brush across the plate, accurate micro-sized quantities of powder dispensed substantially simultaneously through each of the individual bores into containers positioned below the bores. The arrangement includes a conveyor system for conveying in a step wise manner a plurality of individual containers in a sequential arrangement so that groups of containers are continuously and sequentially positioned for receiving individual quantities of dispensed powder underneath the plate in a fully mechanized automatic production line.

Included herewith is an arrangement for depositing a plug of powder of precise quantity onto the plate prior to the dispensing thereof into the individual openings or bores in the plate. All of the power drives are arranged to operate sequentially in relation to each other in order to provide the proper interaction of parts therein. The arrangement is such that a push pull mechanism is utilized for the operation of the brush mechanism moving across the plate, as well as the dispensing of the plug of powder onto the plate. It should be understood that other similar devices such as a squeegee, for example, might be used to sweep across the surface of the plate. An elevator mechanism is utilized in conjunction with the movement of the push pull mechanism for moving the plate to position it for receiving, in a sequential manner, plugs of powder for the subsequent dispensing thereof into the bores on the plate. As will be appreciated by practitioners-in-the-art, the drive arrangements for the elevator mechanism and the push rod type mechanism for activating the brush may be under the action of compressed air, hydraulic pressure, or electric motors. At any rate, each of the drive mechanisms, including the step wide conveyor belt for conveying the groups of containers under the dispensing plate are under the action of a control mechanism, as will be appreciated, so that each individual part is activated or moved in relation to every other part in the desired sequence of operation.

With the foregoing and additional objects in view, this invention will now be described in more detail, and other objects and advantages thereof will become apparent from the following description, the accompanying drawings, and the appended claims.

DETAILED DESCRIPTION OF THE INVENTION

Figure 1:
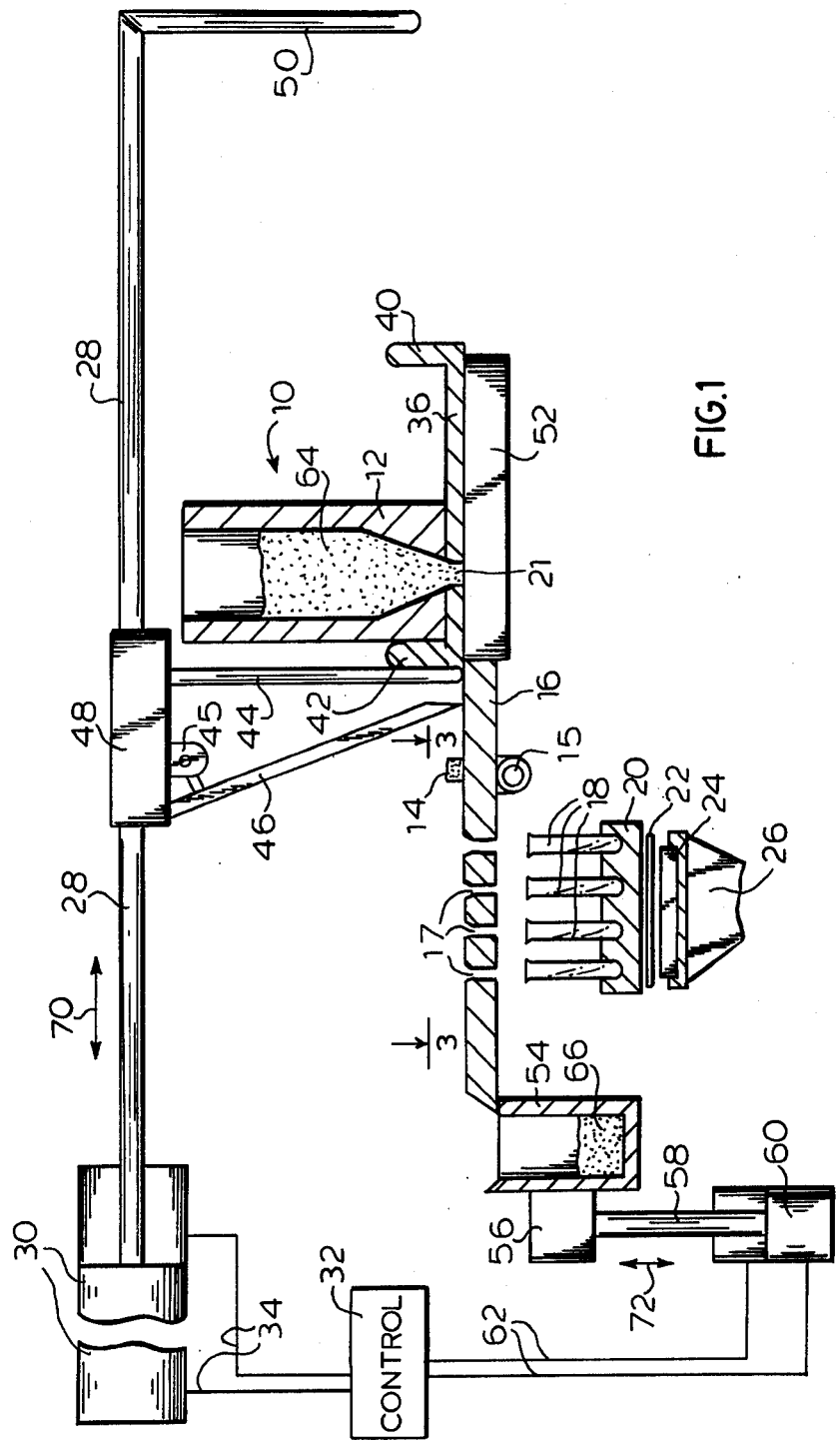
FIG. 1 is a somewhat diagramatic vertical sectional view of apparatus illustrating the invention.

Referring to the drawings in which like reference characters refer to like parts throughout the several views thereof, FIG. 1 shows the dispensing apparatus generally designated 10 having a dispensing plate 16 with openings or bores 17 therein through which openings 17 a slug of powder 14 is dispensed in equal micro quantities. Positioned below each opening 17 is a container 18, which may be in the form of a blood collection tube, for example, for receiving the powder dispensed. Tubes 18 are conveyed in containers 20 for holding the tubes 18. Containers 20 are moved on a conveyor belt 22, which moves along a plurality of spaced rollers 24 as will be appreciated by practitioners-in-the-art, with rollers 24 supported by a base structure 26. Conveyor belt 22 is driven in the usual manner by a drive roller positioned along the length thereof, as will be appreciated.

Positioned adjacent dispensing plate 16 is a fixed table 52 which holds a storage bin 12 for a supply of the powder 64 being dispensed. Positioned immediately beneath container 12 is a sliding dispensing table 36 having upstanding arms 40, 42. Table 36 slides from the position shown in FIG. 1 to the position shown in FIG. 2c, as will be described in more detail below, in order to convey a slug of powder 21 (FIG. 1) falling from the supply 64 to a position 14 on dispensing plate 16, as shown in FIG. 1.

Positioned above dispensing plate 16 and table 52 is a push rod 28 which reciprocates from right to left and visa versa, as shown in FIG. 1, by arrow 70 under the action of a reversible motor 30. Rod 28 includes a body 48 from which is suspended a pusher 44 which cooperates with an upstanding arm 42 of slide table 36 for moving the slide table 36 to the right in FIG. 1. By the same token, the pusher 50 shown in FIG. 1 cooperates with the arm 40 on slide table 36 for moving the table to the left as shown in FIG. 1.

Also suspended from body 48 is a brush 46, which moves with push rod 28 to move across the top surface of dispensing plate 16. Such movement of brush 46 serves to move slug 14 and dispense the quantity of powder therein through the plurality of bores 17 in plate 16. As discussed above, other devices such as a squeegee can be used to provide this sweeping action. When the brush 46 moves to the left-hand end of dispensing plate 16, any residual powder from slug 14 falls into waste bin 54 to be collected as waste powder 66. Positioned on one wall of bin 54 is a support bracket 56 for receiving a vertical slide rod 58, which in turn moves vertically in the direction of arrow 72 under the action of reversible motor 60 for vertically moving plate 16 for a purpose to be described below. Reversible motors 30, 60 operate under the action of control 32 so that the movements thereof are in proper sequence for the operation of the apparatus herein. Control 32 is connected with motor 30 through lines 34, and with motor 60 through lines 62.

Positioned on body 48 is a vibration motor 45 which imparts a vibrating movement to brush 46 for enhancing the dispensing of powders from plate 16 through bores 17. Attached to dispensing plate 16 is a vibration motor 15 which serves the same purpose of imparting a vibrating movement to plate 16 for enhancing the dispensing action through bores 17.

Figure 2A:
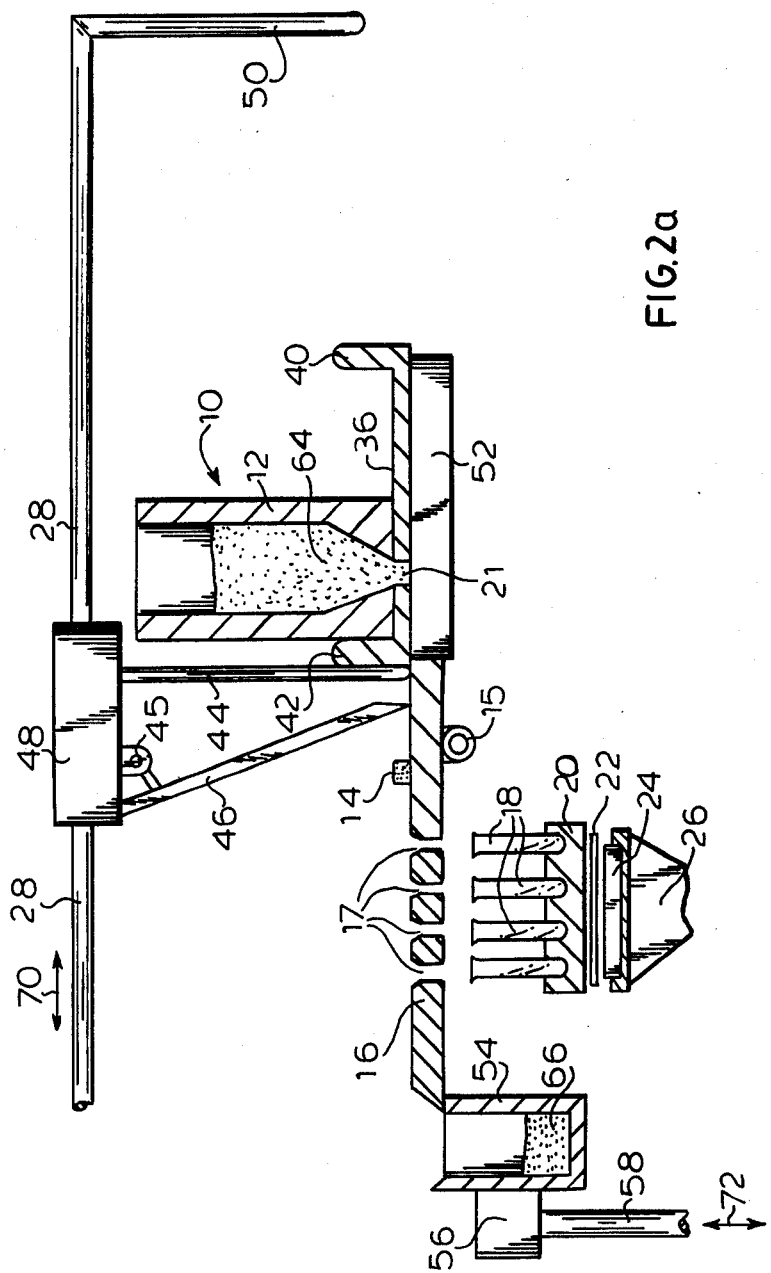
FIGS. 2a–2e are a plurality of views of the apparatus of FIG. 1 with each view showing the apparatus in a different position of movement thereof.

Referring to FIGS. 2a-2e, the sequence of movements of the apparatus shown and described in FIG. 1 is as follows. In FIG. 2a, the powder stored in hopper 12 forms a slug at the bottom of hopper 12 in slot 21 in slide table 36. It is formed of the proper desired size to produce slug 14. A slug of powder 14 was deposited previously on table 16, as shown in FIG. 2a. The conveyor belt 22 has conveyed in a step wise manner a container 20 underneath plate 16, so that individual container tubes 18 are in alignment with bores 17. Table 16 has been moved by motor 60 to its uppermost position, while push rod 28 has been moved to its right-hand position.

Figure 2B:
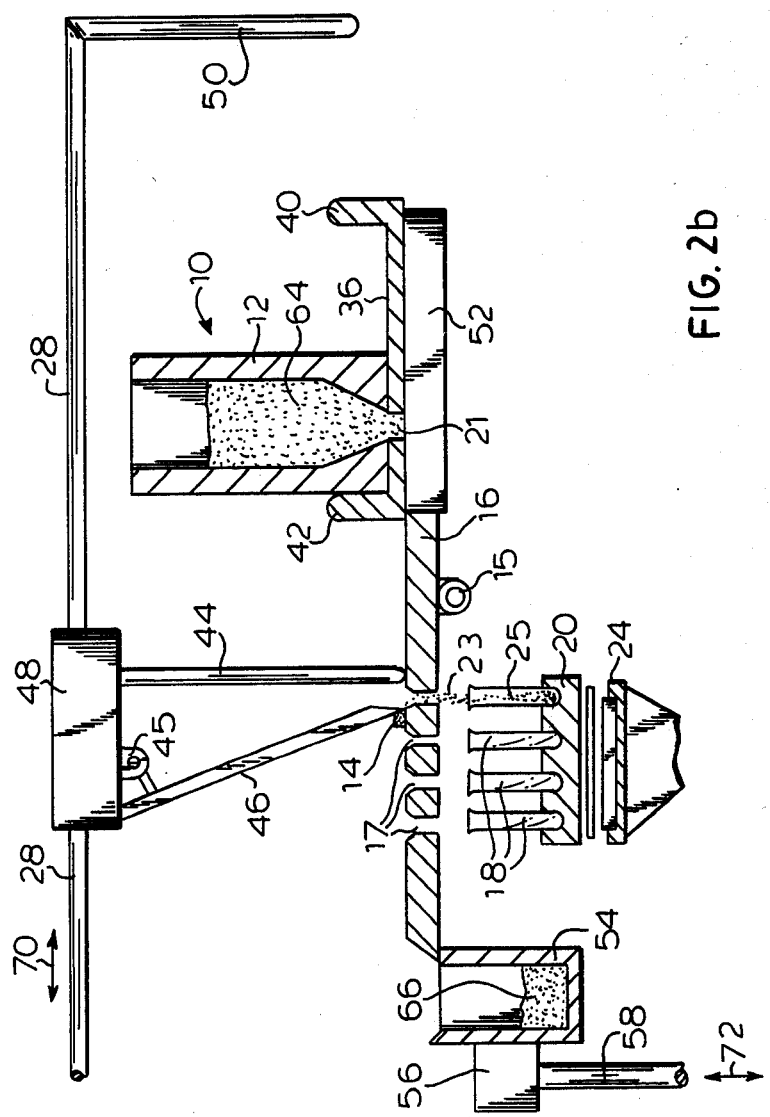

Referring now to FIG. 2b, it will be observed that push rod 28 has been moved by motor 30 to the left under the action of control 32 (it should be noted that motor 30 is dimentioned to provide the proper length of travel of push rod 28 as well know to practitioners in the art. Motor 30 is shown in the diagramatic illustration in FIG. 1 in a small dimension in order to simplify the illustration.) At any rate, brush 46 has moved to the left to the position shown in FIG. 2b and has moved slug 14 past the first row of bores 17 for dispensing a portion 23 of the reagent powder being dispensed into a first filled row 25 of tubes 18. Motors 15 and 45 under control 32 are operating during this course of movement so as to impart a vibrating movement to table 16 and brush 46, respectively.

Figure 2C:
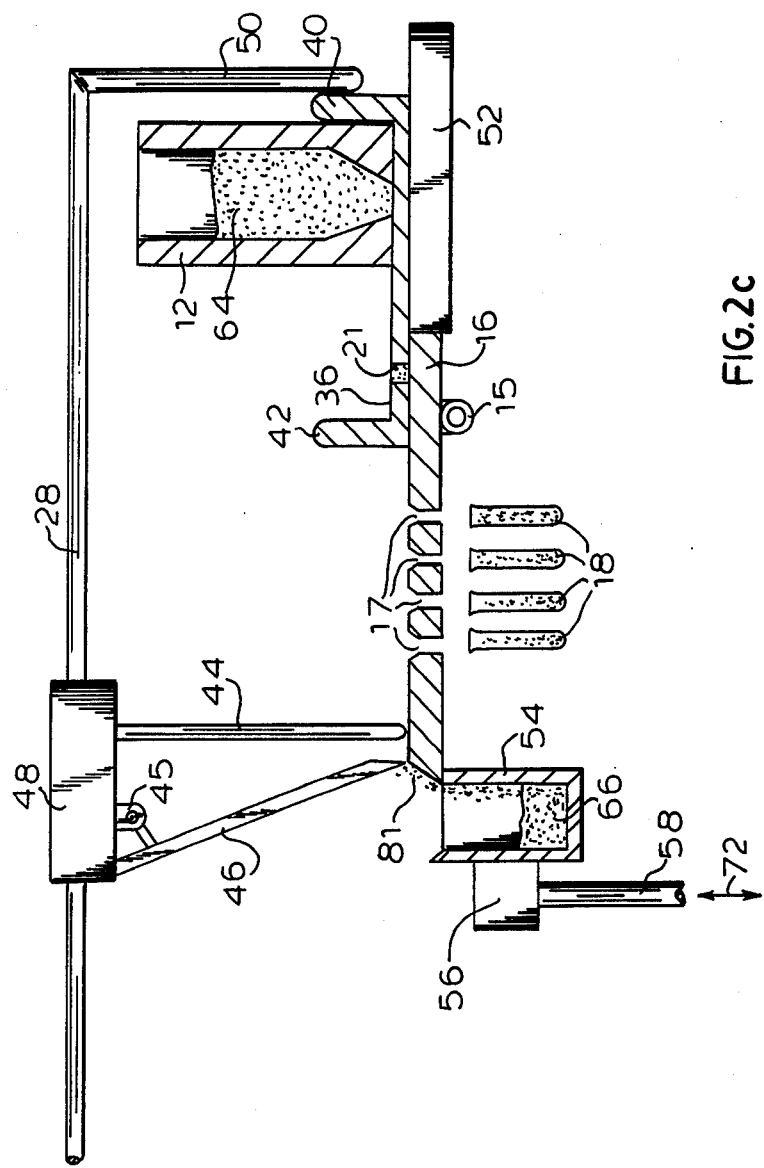

Referring now to FIG. 2c, it will be observed that brush 46 has traversed the entire extent of plate 16 under the action of push rod 28, and the residue 81 of the slug 14 is dispensed into the waste bin 54. During this ame left-hand movement of brush 46 under the action of rod 28, pusher 50 has engaged arm 4 of slide table 6 and moved it to the left, so that the left-hand end of slide table 36 has moved onto dispensing plate 16. At this point, each of tubes 18 have been filled with substantially equal micro portions of reagent powder from the original slug 14.

Figure 2D:
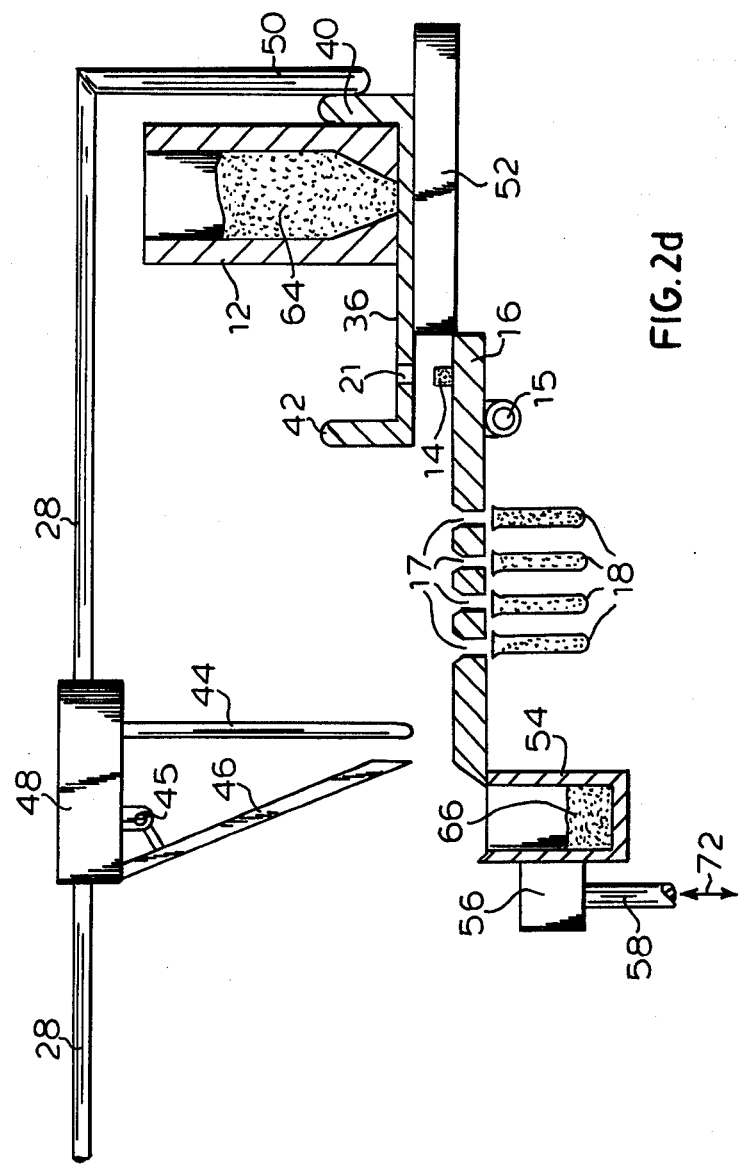

Referring to FIG. 2d, the next movement is the lowering of dispensing table 16 together with the components fixed thereto including bin 54 and bracket 56. This movement is by motor 60 under control 32 (FIG. 1). When table 16 is lowered to the position shown in FIG. 2d, a new slug 14 is left on table 16 from the slide table 36 because the left-hand end thereof is now suspended over table 16.

Figure 2E:
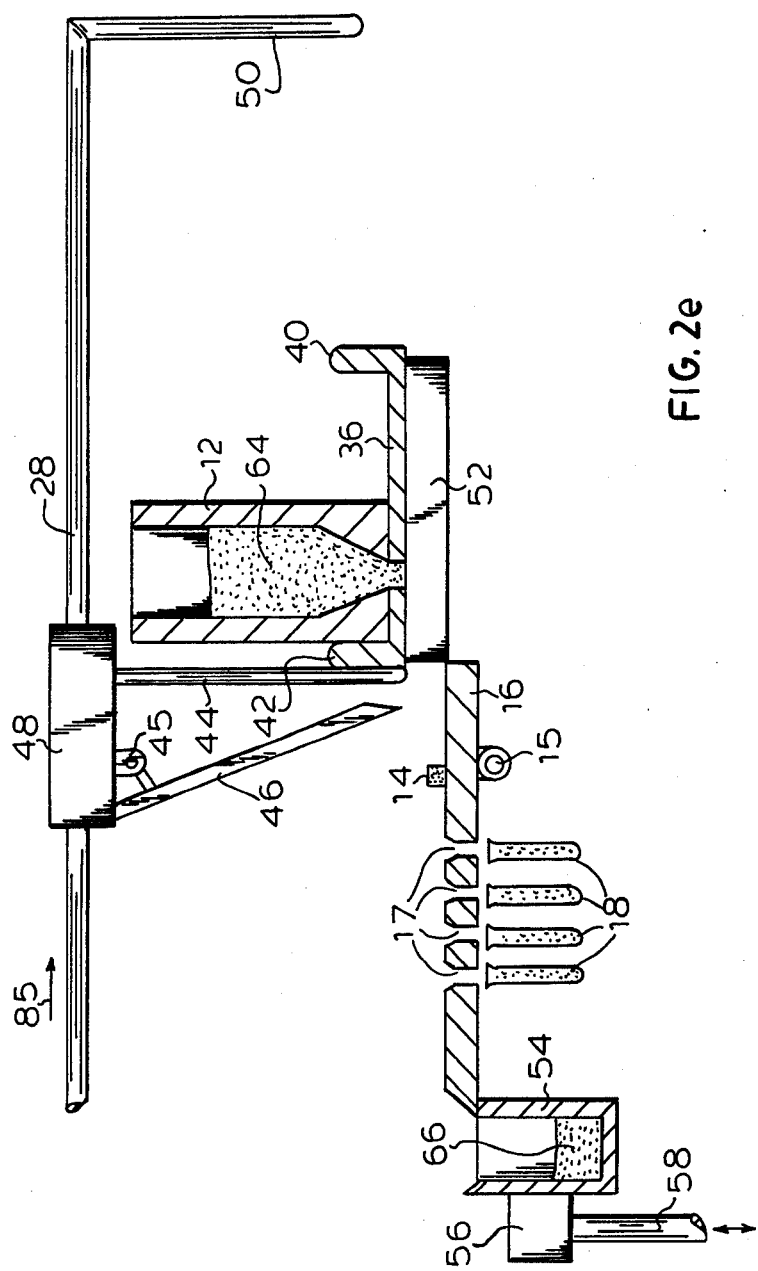
Figure 3:
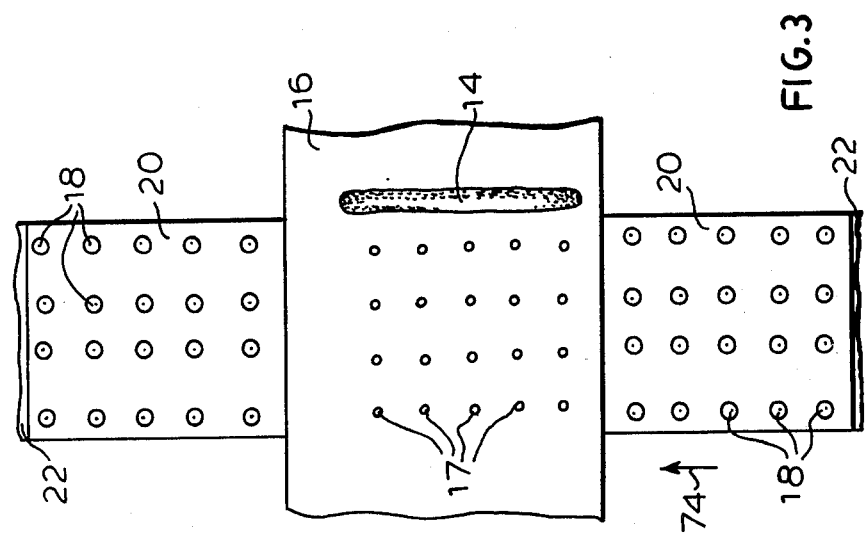
FIG. 3 is a view taken along lines 3—3 of FIG. 1.

As shown in FIG. 2e, the next movement is the movement to the right of push rod 28 in the direction of arrow 85. This causes pusher 44 to engage arm 42 of slide table 36 for moving slide table 36 back to its original position on fixed table 52. Once this has taken place, dispensing table 16 may be moved vertically upwardly to its original position as shown in FIG. 2a, for a repetition of the sequence of movements. It will be understood, that during this movement of table 16 upwardly, conveyor belt 22 is activated by control 32 to move another container 20 with a new group of empty containers 18 adjacent bores 17 for a subsequent filling of a new quantity of containers 18. As can be seen in FIG. 3, conveyor belt 22 moves under control 32 in the direction of arrow 74 in a step wise manner in order to move containers 20 adjacent the bores 17 in table 16 for the dispensing of a slug of powder 14 through bores 17.

Figure 4:
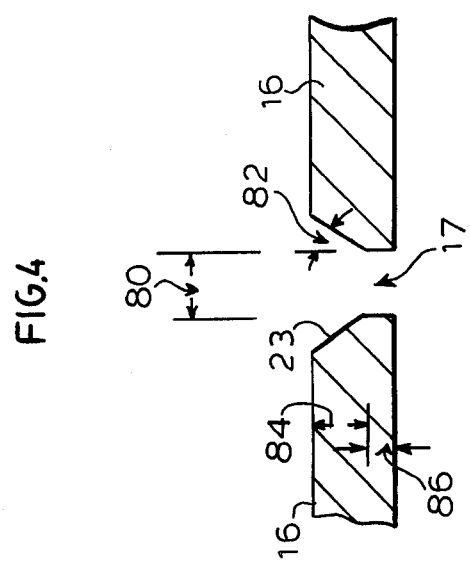
FIG. 4 is an enlarged cross-sectional view of one opening or bore in the powder dispensing plate showing the configuration and dimensions thereof.

Referring now to FIG. 4, an enlarged sectional view of a single bore 17 as shown. As purely illustrative of the dimensions which may be utilized for each individual bore 17 for the desired controlled dispensing of powder, the diameter 80 of each individual bore 17 is 0.03 inches. The angle 82 from the axis of bore 17 is 30 degrees. The depth 84 of the converging portion 23 of bore 17 is 0.04 inches while the depth 86 of the remaining portion of bore 17 is 0.015 inches.

Thus, as will be appreciated from the foregoing, there is provided in accordance with this invention, methods and apparatus not only for dispensing in micro quantities portions of hard to handle reagent powders, but also an arrangement wherein a plurality of such micro quantities of powder may be dispensed substantially simultaneously utilizing mass production techniques so that the process and apparatus herein are highly economical. That is, the proper control is maintained while still reducing the cost because the process and apparatus herein may be incorporated in a continuous line for dispensing a plurality of different materials into the containers in a step wise manner along a production line.

While the methods and apparatus herein disclosed form preferred embodiments of this invention, this invention is not limited to those specific methods and apparatus, and changes can be made therein without departing from the scope of the invention which is defined in the appended claims.

What is claimed is:

1. Apparatus for the controlled simultaneous dispensing of a plurality of quantities of fine powder into a plurality of waiting containers, characterized by
   (a) a fine powder storage bin;
   (b) a powder dispensing plate adjacent said bin;
   (c) a plurality of equally dimensioned dispensing bores in said plate;
   (d) a slide reciprocable horizontally between said bin and said dispensing plate for carrying sequentially, slugs of powder to said plate;
   (e) a powder slug forming aperture in said slide for receiving sequentially slugs of powder from said storage bin;
   (f) a member reciprocable over said plate for moving a slug of powder disposed thereon over and through said dispensing bores;
   (g) conveyor means movable stepwise, under said dispensing plate for moving sequentially pluralities of containers under said dispensing bores;
   (h) first power means connected to said dispensing plate for moving said dispensing plate from a first position for engaging said moving member to a second position for receiving said slide with a new slug of powder thereover, and vice versa;
   (i) second power means for moving said slug moving member and said slide from a first position to one side of said dispensing plate to a second position over said dispensing plate, and vice versa; and
   (j) control means connected to said conveyor means and said first and second power means for the sequential operation thereof.

2. The apparatus of claim 1, further characterized by
   (a) first vibrating means connected to said slug moving member for the vibration thereof;
   (b) second vibrating means connected to said vibrating plate for the vibration thereof; and
   (c) said first and second vibrating means connected to said control means.

3. The apparatus of claim 1, further characterized by
   (a) a horizontally movable pushrod connected to said second power means;
   (b) a pair of spaced vertical pushers suspended from said pushrod;
   (c) an upstanding arm on each end of said slide; and
   (d) one of said pushers engaging one of said upstanding arms for the reciprocation of said slide, and vice versa depending upon the direction of reciprocation of said slide.

4. The apparatus of claim 3, further characterized by
   (a) said slug moving member is a brush suspended from said pushrod for the reciprocation of said brush over said dispensing plate.

5. The apparatus of claim 1, further characterized by
   (a) each of said plurality of dispensing bores has a diameter of 0.03 inches.

6. The apparatus of claim 5, further characterized by
   (a) each of said plurality of dispensing bores has an upper portion with walls converging toward the lower end; and
   (b) a lower portion with vertical walls.

7. The apparatus of claim 6, further characterized by
   (a) the vertical extent of said upper portion is 0.04 inches; and
   (b) the vertical extent of said lower portion is 0.015 inches.

8. The apparatus of claim 7, further characterized by
   (a) said converging walls are at an angle of 30 degrees from the axis of the related bore.

9. A process for controlling the dispensing simultaneously of a plurality of portions of fine powders into individual containers, characterized by
   (a) utilizing a dispensing plate having a plurality of spaced apart dispensing bores therein of specific dimensions depending upon the desired quantity of each of said plurality of portions;
   (b) depositing sequentially on said dispensing plate along one side edge thereof elongated slugs of fine powder to be dispensed;
   (c) after said dispensing step, sweeping a brush across said dispensing plate from said forming step to sweep said slug of fine powder through said dispensing bores;
   (d) receiving said plurality of portions of dispensed powder from said sweeping step in a plurality of containers positioned under said dispensing bores; and
   (e) repeating said depositing and sweeping steps while simultaneously moving a new set of containers for said receiving step under said dispensing bores.

10. The process of claim 9, further characterized by
    (a) said utilizing step being carried out with a dispensing plate having said bores with a diameter of 0.03 inches.

11. The process of claim 10, further characterized by
    (a) said bores having the walls of the upper portion thereof converging downwardly and the walls of said lower portion vertical.

12. The process of claim 11, further characterized by
    (a) said converging upper walls being at an angle of 30 degrees from the axis of each individual bore.

* * * * *